March 16, 1943.   I. E. McCABE   2,313,835
TEMPERATURE CONTROLLING SYSTEM
Original Filed Aug. 3, 1938   2 Sheets-Sheet 1

INVENTOR.
IRA E. McCABE
BY Langdon Moore
ATTORNEY.

March 16, 1943.  I. E. McCABE  2,313,835

TEMPERATURE CONTROLLING SYSTEM

Original Filed Aug. 3, 1938   2 Sheets-Sheet 2

INVENTOR.
IRA E. McCABE
BY
ATTORNEY.

Patented Mar. 16, 1943

2,313,835

UNITED STATES PATENT OFFICE 2,313,835

TEMPERATURE CONTROLLING SYSTEM

Ira E. McCabe, Chicago, Ill.

Original application August 3, 1938, Serial No. 222,865. Divided and this application January 6, 1941, Serial No. 373,269

7 Claims. (Cl. 236—91)

This invention relates to an improved system for controlling the temperature within a building employing an electrically operated and controlled heating plant and more particularly to such a system which responds to sudden and decided changes in temperature exterior of the building and anticipates the resulting demands upon the heating plant to maintain an even temperature within the building.

Thermostats have long been used for controlling the operation of automatically controlled heating plants for the purpose of establishing a desired temperature in a space to be heated. These devices operate on a differential in temperature, which may be one degree, to call for an operation of the heating plant upon a drop in the temperature of the space to be heated and to stop said operation when the temperature of the space has risen an amount equal to the operating differential of the thermostat.

With these conventional types of thermostats it has been possible, when constructed to be very sensitive to temperature changes, to open and close a circuit upon a change of one degree temperature at the thermostat. It has also been possible to maintain the temperature of the space substantially at the setting of the thermostat, when a temperature differential exists between the space to be heated and a space exterior therefrom, such as the outdoors, providing the exterior temperature difference is established by a slow change in temperature or remains substantially around a certain degree. The conventional types of thermostats have proven inadequate when quick or drastic changes in exterior temperature occur, whether they be toward higher or lower temperatures, to prevent such changes from resulting in an over or under temperature condition in the space to be heated. This can be attributed to a delay in modifying the effect of such exterior temperatures upon the interior space, whereby when the thermostat does finally operate, either to stop or start the heating plant, the effect of a rising exterior temperature when the plant is operating may produce an overtemperature condition in the space, and when the exterior temperature is falling, the lag in the heating plant in responding to produce the demand made by the thermostat produces an under-temperature condition.

With the best of thermostatic control operation it is natural for the space temperature to decline somewhat after influencing the thermostat to start the heating plant, due to the time required of the plant to produce heat and a slight increase in space temperature is to be expected after the thermostat demand has been met, due to the continued heating effect of the high temperatures produced at the heating source. While these variations may be slight— say, only one degree, and not ordinarily influencing the state of temperature comfort within the space to be heated, they may materially contribute to a state of discomfort, should drastic changes in exterior conditions occur.

A device for accomplishing the same general objectives as this improved system is disclosed in this applicant's prior co-pending application, Serial No. 221,645, filed July 27, 1938, now Patent No. 2,232,957, of February 25, 1941. In said application the single device includes a room thermostat responsive to changes in temperature within the building in combination with a Bourdon tube responsive to changes in temperature exterior of the building so arranged that sudden changes in temperature exterior the building varied the normal response of the room thermostat to ambient temperature to anticipate the demand upon the heating plant resulting from sudden changes in temperature exterior of the building.

It is an object of this invention to provide a system of thermostatic control employing at least two thermostats one located within a space to be heated, such as a building, and the other located exterior of said space, such as the outdoors, said thermostats being electrically connected in the system so that the exterior thermostat in responding to reversals in temperature influences the temperature requirements of the thermostat located within the space to be heated whereby control of the heating plant by the interior thermostat located within the space to be heated will produce the same results, as disclosed above, by the single device of the applicant's co-pending application.

This system offers an advantage over the method of control accomplished by the single device of the co-pending application. In the single device, one of the temperature responsive means is a vapor pressure actuated element having a bulb, containing the thermal liquid, subjected to the temperature exterior of the building thus making it expedient to locate the device where the connecting tubing between the bulb and element may be as short as possible both from the standpoint of installation as well as appearance. In this improved method of control, each of the temperature responsive devices may be independent units, each operating their respective switches on the control circuit and thus may each be located at points deemed best suitable for their operation, accessibility to adjustment, appearance and installation in the system.

This application is a division of this applicant's prior co-pending application Serial No. 222,865, filed August 3, 1938, now Patent No. 2,233,674, of March 4, 1941.

With these and other objects in view reference is made to the accompanying sheets of drawings illustrating a preferred form of this invention with the understanding that detail changes may be made without departing from the scope thereof.

In the drawings:

Figure 1 is a schematic view of an application of this improved system of controlling an electrically operated and controlled fluid fuel burning heating plant shown in diagram as located in a building together with a thermostat shown in diagram located within the same building and a cooperating thermostat shown in diagram located upon the exterior of said building, and a wiring diagram of the electrical connections of the two thermostats to each other and to the electrical controls of the heating plant.

In the embodiment of this invention, illustrated in Figure 1, a commercial boiler or furnace A for the heating plant is shown located below the floor B of a building having a side wall C. A commercial electrically operated and controlled fluid fuel burner D is shown installed in connection with the boiler of furnace A. The electric current is shown passing through the wires L and L' from the source of commercial current through a hand switch HS and through a commercial boiler control BC to a control panel CP of commercial construction.

The control panel mounts various switches and binding posts for connecting the line current to the motor M and ignition transformer and includes transformer means for the secondary circuit to the thermostats T¹ and T² as disclosed in this applicant's prior Patent No. 2,024,697, granted December 17, 1935.

Figure 2:
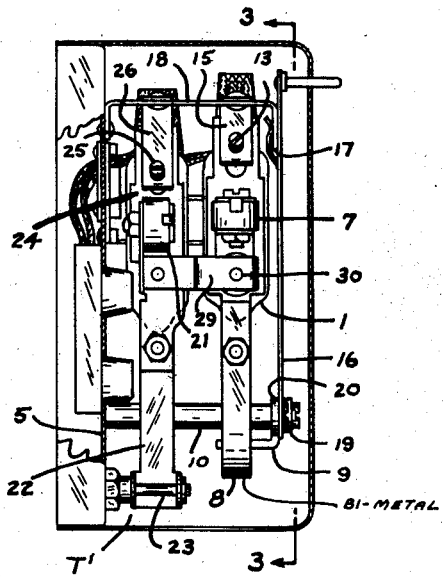
Figure 2 is an enlarged detail view in section of the thermostat located within the building, taken on the line 2—2, Figure 3, looking in the direction of the arrows.
Figure 3:
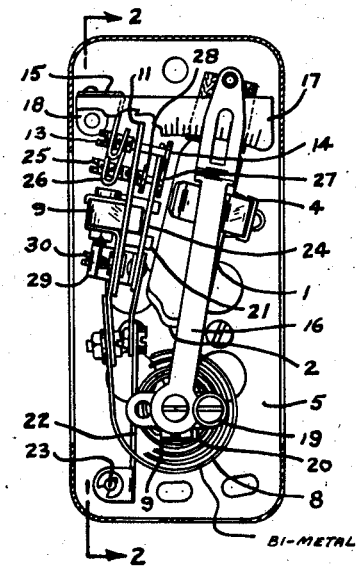
Figure 3 is a similar view taken on the line 3—3, Figure 2, looking in the direction of the arrows.

The thermostat T¹ is shown in detail in Figures 2 and 3. This instrument includes two magnetically operated mercury tube switches 1 and 2, preferably of the type disclosed in Patent No. 2,085,316, granted June 29, 1937, and is preferably mounted on the wall of the building in the room wherein a certain pre-determined temperature is desired to be maintained and is responsive to changes in ambient temperature.

Figure 4:
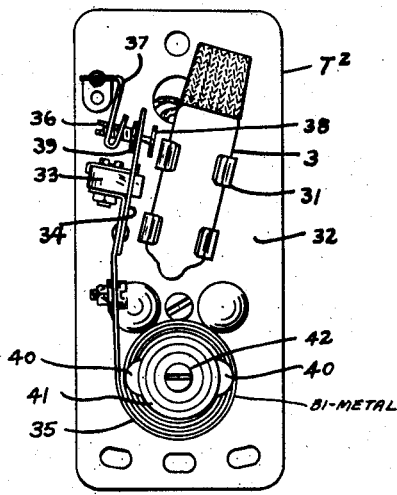
Figure 4 is an enlarged detail view in front elevation of the thermostat located upon the exterior of the building.

The thermostat T² is shown in detail in Figure 4 of the drawings. This instrument includes a single magnetically operated mercury tube switch 3 of the same type as the switches 1 and 2 and is preferably on the outside of a wall of the building and is responsive to changes in temperature upon the exterior of the building.

As shown in Figures 2 and 3, the mercury tube 1 of thermostat T¹ is mounted in a bracket clip 4 extending outward from a base 5 which bracket also mounts the mercury tube switch 2 parallel to tube 1 intermediate between tube 1 and the base 5.

Figure 5:
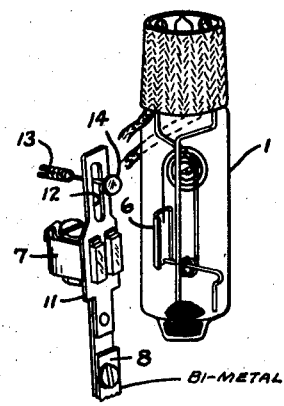
Figure 5 is a fragmentary, enlarged detail view in perspective of the outer magnetically operated mercury tube switch shown in Figures 2 and 3 and the magnetic operator therefor.

As shown in detail in Figure 5, the mercury tube switch 1 includes an armature 6 mounted upon one of the electrodes of the switch, which in this case is normally in the open position. A magnet 7 is mounted on the free outer end of a thermostatic coil 8, the inner end of which is mounted on a bracket 9 rotatably carried on the end of a post 10 mounted upon the base 5. As the thermostatic coil 8 responds to changes in ambient temperature the magnet 7 will be caused to approach or depart from the tube 1. The armature 6 will be influenced by the magnet when adjacent to the exterior of the tube 1 to close the circuit through the switch and when the magnet is moved to carry its magnetic field away from the tube 1 sufficiently to free the armature, the switch 1 will open. The magnet 7 is preferably carried on a plate 11 with its lower end secured to the free outer end of the coil 8. The plate 11 extends beyond the upper side of the magnet 7 and is provided with an elongated slot 12 for the reception of a screw threaded member 13 having an enlarged head 14 on the side adjacent the tube 1. The screw threaded member 13 is adjustably received in a bracket 15 whereby the approach of the magnet 7 to the exterior of the tube 1 may be adjusted. The end of the post 10 also mounts one end of an adjusting lever 16, the other end of which is adapted to travel over a calibrated temperature scale 17 supported by brackets 18 upon the base 5. The end of the lever 16 mounted upon the post 10 is adjustably secured to the bracket 9 mounting the inner end of the coil 8 by an adjusting screw and washer 19 mounted upon an extension 20 from the bracket 9, whereby the coil 8 may be calibrated to open and close the switch at a pre-determined temperature.

The second mercury tube switch 2 carried on the base 5 by the clip bracket 4 is opened and closed by a magnet 21 carried upon the upper free end of a metal strip 22, the lower end of which is pivotally mounted upon a stud 23 upon the base 5. The magnet 21 is mounted upon a plate 24, similar to the plate 11 mounting the magnet 7, and is provided with a similar elongated slot. The travel of the magnet 21 toward and from the tube 2 is limited by a screw threaded member 25, similar to the adjustable screw threaded member 13, which is adjustably mounted in a bracket 26. As shown in Figure 2, the brackets 15 and 26 mounting the screw threaded adjusting members 13 and 25 are preferably mounted upon one of the brackets 18. The adjustable screw threaded member 25 in the bracket 26 terminates in an enlarged head 27, similar to the head 14 on the other adjusting member 13, and in addition thereto is provided with an annular flange 28 of similar size as the head 27 but spaced apart therefrom and on the opposite side of the plate 26 to limit the travel of the plate 24 away from the switch tube 2. The pivot stud 23 is located so that the weight of the plate 24 and magnet 21 will normally cause the plate 24 to rest against the head 27 with the magnet at the end of its movement toward the tube 2 to close the circuit therethrough. To open the switch 2 the metal strip 22 is provided with a bracket having an arm 29 mounted thereon to extend over the outer side of the plate 11 secured to the outer end of the coil 8 and is provided with an adjusting screw 30 to engage said plate, so that as the temperature rises and causes the switch 1 to open and upon continued movement of the coil 8 in that direction the engagement of the plate 11 with the arm 29 will thereafter cause the strip 22 to rotate about its pivot 23 to move the magnet 21 away from the tube 2 and cause the switch 2 to open. The adjusting members 13, 25 and 30 are so adjusted that upon changes in ambient temperature the switch 2 is closed before the switch 1 and the switch 1 is opened before the switch 2.

As shown in Figure 4, in the thermostat T² the switch tube 3 is mounted in a bracket clip 31 extending outwardly from the base 32. A magnet 33 is carried upon a plate 34 secured to the outer free end of a thermostatic coil 35, to operate the switch 2 in the same manner as the switch 1, except in this thermostat T² the screw threaded adjusting member 36 mounted in the bracket 37 upon the base 32 is provided with two spaced apart stops in the form of an enlarged head 38 and an annular flange 39, similar to the screw threaded adjusting member of switch 2 of thermostat T¹. The inner end of the thermal coil 35 is secured to a bracket similar to the bracket 9 rotatably mounted on a post, not shown, supported upon the base 32 and is provided with extensions 40, similar to the extension 29 on the bracket 9 shown in Figure 3. In place of an adjusting lever a friction washer 41 is mounted on the end of the post having an adjusting screw 42 threaded axially in the end of the post. The free movement of the plate 34 between the stops 38 and 39 which will still operate the switch is the minimum operating differential which may be increased by turning the screw threaded adjusting member 36 to advance the stops in the direction of the tube 3. Further movement of the coil 35 in response to temperature changes in the same direction after the magnet carrying plate 34 has engaged either one of the stops 38 or 39 imparts a movement to the bracket connected to the inner end of the coil 35 against the friction of the washer 21. In other words, in this thermostat T² an over-ride means is provided after a change in temperature has opened or closed the switch.

In carrying out this invention the switches in thermostat T¹ may be adjusted so that movement of the bi-metal member 8, in response to falling temperatures will first allow the rear switch 2 to close, whereafter, upon the continued falling of the temperature the front switch 1 is closed, and will therefore in the case of a rise in temperature first open the front switch and then thereafter open the rear switch. The rear switch may, for example, close at 71° and open at 72° and the front switch may, for example, close at 70° and open at 71°. The thermostat T² may be adjusted so that the operating differential is 5°, in which event the switch 3 will maintain an open circuit on rising temperature after an initial increase of 5° and will maintain a closed circuit on a falling temperature after an initial decrease of 5°.

Figure 1:
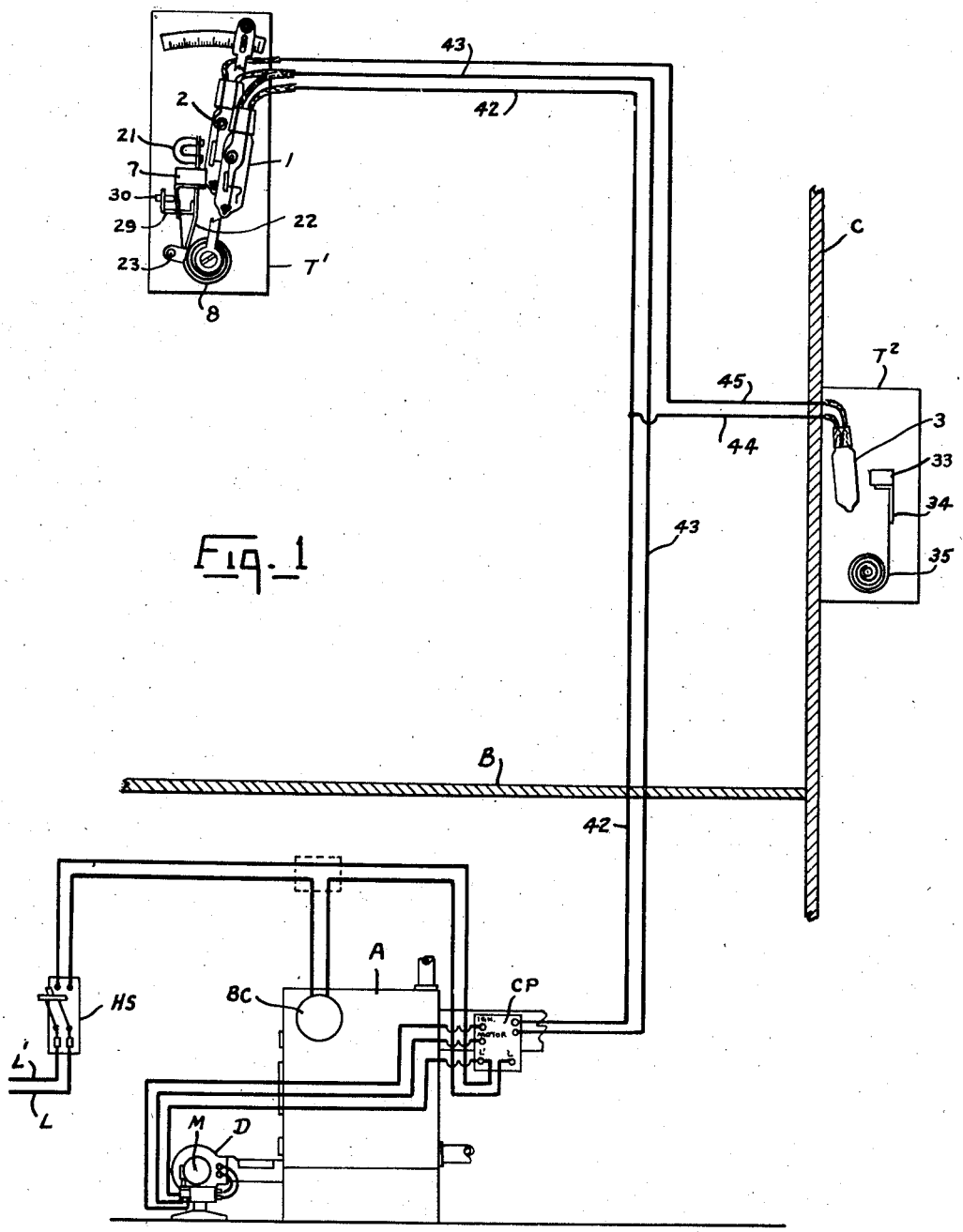

This invention contemplates connecting the switches 1, 2 and 3, as shown in the wiring diagram in Figure 1. The electrodes of switch 1 are connected by wires 42 and 43 in the secondary circuit of the control panel CP which circuit normally controls the operation of the burner D. One electrode of the switch 3 is connected by wire 44 to wire 42 in the secondary circuit and the other electrode in the switch 3 by wire 45 to one electrode of the switch 2 and the other electrode of the switch 2 is connected to the wire 43 of the secondary circuit. It is therefore seen if switch 3 of the thermostat T² is open, as in the case of rising outdoor temperature, the circuit is also open through the high temperature switch 2 of the thermostat T¹ and in no way affects the operation of the burner and therefore during a period of rising outdoor temperature the low temperature switch 1 of the thermostat T¹ controls the operation of the burner. Upon a drop in outdoor temperature sufficient to close the switch 3 then switch 2 controls the operation of the burner. Switch 1 again takes charge of operating the burner when the outdoor temperatures again change to one of a rising temperature.

The two stage operation of the thermostat T¹ may be accomplished through the use of two independent thermostats, or pressure responsive devices may be substituted for the thermostats which devices are responsive, for example, to boiler steam pressures, with each device set for one stage of control operation and connected in the control system, with the thermostat exterior of the building to provide the system of the control disclosed by this invention and be the full equivalent thereof.

This invention therefore provides a system of temperature control in which a reverse in temperature at one source will influence the demands made by a thermostatic device or devices located in a space in which an even temperature is desired to be maintained, so that the effect which the temperature at one source may have upon the space to be heated is anticipated and compensated for by raising or lowering the demands of the said space rather than permitting the effects of such changes actually influencing the said space before thermostatic operation occurs, whereby substantially constant temperatures are made possible within the said space and overheating and under-heating conditions are eliminated or minimized regardless of the state of the temperature condition exterior the space to be heated.

This system may be used to control cooling apparatus as well as heating apparatus or systems.

It is to be understood that in adapting the heating system described herein to a cooling system that certain changes may be necessary in the two stage thermostat such as, constructing the coil of bi-metallic metal to respond to temperature changes to cause a reversal of the direction of movement of the free end thereof. Likewise, it may be desirable to cause one switch to be closed by the magnet while the other switch be caused to open by the magnet. Under some circumstances or conditions, it may be desirable to open one circuit while the other is closed by this two stage thermostat. It is also to be understood that this two stage thermostat may be employed in other applications which may require the above changes in details above described.

What I claim is:

1. In a system for controlling the operation of an electrically operated and controlled heating plant for a building to anticipate changes in the operation of the heating plant required by changes in temperature exterior of said building to maintain a desired temperature within the building including a room thermostat having a thermal responsive means responsive to changes in ambient temperature for automatically operating a switch in the control circuit, a second switch in said room thermostat actuated by said thermal responsive means to close in advance of and to open subsequent to the normal closing and opening of the first switch, and a third switch having a thermal responsive means responsive to changes in temperature exterior of the building automatically operating to open said switch upon an initial rise and close said switch upon an initial drop in exterior temperature, said second and third switches connected in series with each other and in parallel with the first switch in the control circuit, said first switch normally controlling the heating plant, said second switch upon the closing of the third switch controlling the heating plant in advance of the normal control of the plant by said first switch, whereby upon a decline in exterior temperature the effect thereof upon the interior is anticipated by controlling the heating plant in advance of its normally controlled operation by said first switch, said normal control by the first switch being effective upon the opening of the third switch upon an initial rise in exterior temperature.

2. In an automatically controlled temperature conditioning apparatus, a system of temperature control for the operation thereof, thermostatic control means located within a space where the temperature is desired maintained and operative to control said conditioning apparatus to maintain one or the other of two pre-selected degrees of temperature within the space, and thermostatic control means responsive to temperature conditions exterior of the space, acting, upon a predetermined initial increase or decrease in temperature occurring at any stage throughout the entire range of exterior temperature changes to render the operation of the space thermostat effective to maintain one of said pre-selected degrees of temperature when the exterior temperature is declining and the other of said pre-selected degrees of temperature when the exterior temperature is rising.

3. In an automatically controlled heating plant for a building a system of control for the operation thereof including a thermostatic control means located in a space within said building operative to control said conditioning apparatus to maintain pre-selected high and low degrees of temperature of said space within said building and thermostatic control means responsive to temperature conditions exterior of the space acting upon a pre-determined initial increase or decrease in temperature occurring at any stage throughout the entire range of exterior temperature changes, to render the building space thermostat effective to maintain the pre-selected high degree of temperature when the exterior temperature is declining and the low degree of temperature when the exterior temperature is rising.

4. An automatically controlled temperature conditioning apparatus, a system of temperature control for the operation thereof including a thermostatic device operating upon changes in temperature in a space where maintenance of the temperature is desired to sequentially open and close two switches to maintain different pre-selected degrees of temperature in said space, each switch connected in circuit with the conditioning apparatus for the individual control thereof and a means of thermostatic control located exterior of said space, said means operative upon a pre-determined initial increase or decrease in exterior temperature occurring at any stage throughout the entire range of exterior temperature changes to open or close a switch in series with one of the space thermostat switches to limit the control of said apparatus by one of the space thermostat switches to periods when the exterior thermostat switch is closed by declining exterior temperatures, said other space thermostat switch controlling the apparatus when the exterior thermostat switch is open.

5. An automatically controlled heating plant for a building, a system of control for the operation thereof including a thermostatic device operating upon changes in temperature within a space in the building to sequentially open and close two switches, one of said switches operated at a pre-selected high temperature and the other switch at a pre-selected low temperature, each connected in circuit with the heating plant for independent control thereof and a means of thermostatic control located exterior of said space operative upon a predetermined initial increase or decrease in exterior temperature occurring at any stage throughout the entire range of exterior temperature changes to open and close a switch in series with the high temperature switch of the space thermostatic device to limit control of said plant by said switch to periods when the exterior thermostat switch is closed by declining exterior temperatures.

6. In a system for controlling the operation of an electrically operated and controlled heating plant, a two stage room thermostat including a first switch and a second switch each operated in response to different degrees of temperature to open and close, each switch connected in circuit with the control of the heating plant for the independent control thereof, thermostatic responsive means responsive to a pre-selected temperature to open the first switch and upon a continued increase in temperature thereafter to open the second switch, and a third thermostatic responsive switch in circuit with the second switch and thermostatic responsive means for the third switch responsive upon a predetermined initial decrease in exterior temperature to close and maintain said third switch closed until a predetermined initial increase in exterior temperature occurs.

7. The structure of claim 6, wherein the first and second switches are magnetically operated mercury tube switches rigidly supported upon the same base wherein the thermostatic responsive means is a coil of bi-metallic metal supporting a magnet upon the free end to actuate the first switch, and wherein the means to operate the second switch includes a strip pivotally mounted at one end upon the base and mounting a magnet on its free end adapted to operate the second switch, said strip provided with an arm extending in the path of the movement of the free end of said coil.

IRA E. McCABE.